(12) United States Patent
Gibbs (10) Patent No.: US 11,065,927 B2
(45) Date of Patent: *Jul. 20, 2021

(54) POWER TRAIN FOR AN AMPHIBIAN

(71) Applicant: Gibbs Technologies Limited, Warwickshire (GB)

(72) Inventor: Alan Timothy Gibbs, London (GB)

(73) Assignee: Gibbs Technologies Limited, Warwickshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/437,173

(22) Filed: Feb. 20, 2017

(65) Prior Publication Data

US 2017/0291462 A1 Oct. 12, 2017

Related U.S. Application Data

(63) Continuation of application No. 14/654,112, filed as application No. PCT/GB2013/053409 on Dec. 20, 2013, now Pat. No. 9,573,431.

(30) Foreign Application Priority Data

Dec. 20, 2012 (GB) ..................................... 1223107

(51) Int. Cl.
*B60F 3/00* (2006.01)
*B60K 6/50* (2007.10)
(Continued)

(52) U.S. Cl.
CPC .............. *B60F 3/0007* (2013.01); *B60K 6/50* (2013.01); *F16H 37/06* (2013.01);
(Continued)

(58) Field of Classification Search
CPC ...... B60K 6/50; B60F 3/0007; F16H 37/0806
See application file for complete search history.

(56) References Cited

U.S. PATENT DOCUMENTS

| 3,176,585 A | 4/1965 | Ruf |
| 4,311,472 A | 1/1982 | Hiersig et al. |

(Continued)

FOREIGN PATENT DOCUMENTS

| CN | 101528487 A | 9/2009 |
| CN | 101918229 A | 12/2010 |

(Continued)

OTHER PUBLICATIONS

European Patent Office; International Search Report, dated May 21, 2014.
Search Report; dated Aug. 8, 2016.

Primary Examiner — Stephen P Avila
(74) Attorney, Agent, or Firm — Price Heneveld LLP (57) ABSTRACT

A power train for an amphibian operable in land and marine modes includes a prime mover, at least a first land propulsion unit, a first marine propulsion unit, a second marine propulsion unit, and at least one speed change transmission. The prime mover is arranged to drive the at least first land propulsion unit through/via the at least one speed change transmission in land mode, and the prime mover is arranged to drive the first marine propulsion unit and the second marine propulsion unit through/via the at least one, or another, or combinations of, speed change transmission in marine mode. In addition, the present invention provides an amphibian comprising the power train.

45 Claims, 8 Drawing Sheets

(51) Int. Cl.
*F16H 37/06* (2006.01)
*F16H 37/08* (2006.01)

(52) U.S. Cl.
CPC ..... *F16H 37/0806* (2013.01); *F16H 37/0813* (2013.01); *B60Y 2200/92* (2013.01); *B60Y 2400/87* (2013.01); *Y10S 903/915* (2013.01)

(56) References Cited

U.S. PATENT DOCUMENTS

| | | | |
|---|---|---|---|
| 6,623,317 | B2* | 9/2003 | Roycroft ............... B60K 17/28 |
| | | | 114/344 |
| 8,025,540 | B2 | 9/2011 | Gibbs |
| 9,573,431 | B2* | 2/2017 | Gibbs ................... B60F 3/0007 |
| 2008/0026650 | A1* | 1/2008 | Roycroft ............... B60F 3/0038 |
| | | | 440/12.5 |
| 2008/0108257 | A1 | 5/2008 | Gibbs |
| 2011/0045715 | A1 | 2/2011 | Gibbs |
| 2011/0189906 | A1 | 8/2011 | Gibbs |
| 2011/0189907 | A1 | 8/2011 | Gibbs |
| 2015/0258867 | A1 | 9/2015 | Aoki et al. |
| 2016/0236527 | A1 | 8/2016 | Gibbs |

FOREIGN PATENT DOCUMENTS

| | | |
|---|---|---|
| CN | 101918230 A | 12/2010 |
| FR | 2411095 | 7/1979 |
| GB | 983939 | 2/1965 |
| SU | 395295 | 5/1970 |
| WO | 0216159 | 2/2002 |
| WO | 02060707 | 8/2002 |
| WO | 2012172350 | 12/2012 |

* cited by examiner

POWER TRAIN FOR AN AMPHIBIAN

CROSS-REFERENCE TO RELATED APPLICATIONS

This application is a continuation of U.S. patent application Ser. No. 14/654,112, filed Jun. 19, 2015, entitled "A POWER TRAIN FOR AN AMPHIBIAN," which claims priority to International Application No. PCT/GB2113/053409, filed on Dec. 12, 2013, entitled "A POWER TRAIN FOR AN AMPHIBIAN," the entire disclosures of which are incorporated herein by reference.

BACKGROUND OF THE INVENTION

The present invention relates to a power train particularly suitable for use in an amphibian capable of travel on land and water. More particularly, the power train is suitable for use in a high speed amphibian with at least one retractable wheel and which is capable of planing on water. The present invention also relates to an amphibian having such a power train.

Power trains for use in amphibians are known in the art. These generally fall in into one of two categories. The first are power trains for use in displacement only amphibians which have limited and slow on-water performance. These are generally automotive power trains modified to provide drive to a marine propulsion means. The second category are power trains for use in planing amphibians which suffer from limited on-land performance. These are generally marine power trains modified to provide drive to a wheel or track.

More recently, however, the applicant has developed power trains for use in a new class of high speed amphibians having at least one retractable wheel and which are capable of planing on water. Furthermore, these high speed amphibians provide for good road handling when the amphibian is operated on land or off-road (e.g. in four wheel drive).

There remains, however, a need to improve on these prior art power trains by providing increased flexibility and efficiency in the delivery of drive and power to the marine propulsion means (e.g. jet drives, propellers, etc.) for use of the amphibian on water, as well as improved packaging of the power train. The need to retract wheels and/or wheel suspension assemblies or track drives presents significant problems in terms of packaging, weight distribution and also in terms of how the resulting power transmission pathways can be realised.

SUMMARY OF THE INVENTION

Accordingly, in a first aspect, the present invention provides a power train for an amphibian operable in land and marine modes, the power train comprising:
  a prime mover;
  at least a first land propulsion means;
  a first marine propulsion means;
  a second marine propulsion means; and
  at least one speed change transmission, wherein:
  the prime mover is arranged to drive the at least first land propulsion means through/via the at least one speed change transmission in land mode; and
  the prime mover is arranged to drive the first marine propulsion means and the second marine propulsion means through/via the at least one, or another, or combinations of, speed change transmission in marine mode.

With this arrangement, the power train enables the torque of the prime mover to be better matched to the efficiency of the first and second marine propulsion means when the amphibian is in a marine mode, as well as optimising and efficiently delivering power matched to the torque of the prime mover when the amphibian is operated on land.

In a second aspect, the present invention provides an amphibian comprising the power train as set forth herein.

These and other features, advantages, and objects of the present invention will be further understood and appreciated by those skilled in the art by reference to the following specification, claims, and appended drawings.

BRIEF DESCRIPTION OF THE DRAWINGS

Preferred embodiments of the present invention will now be described by way of example only with reference to the accompanying drawings, in which.

DETAILED DESCRIPTION OF THE PREFERRED EMBODIMENTS

Figure 1:
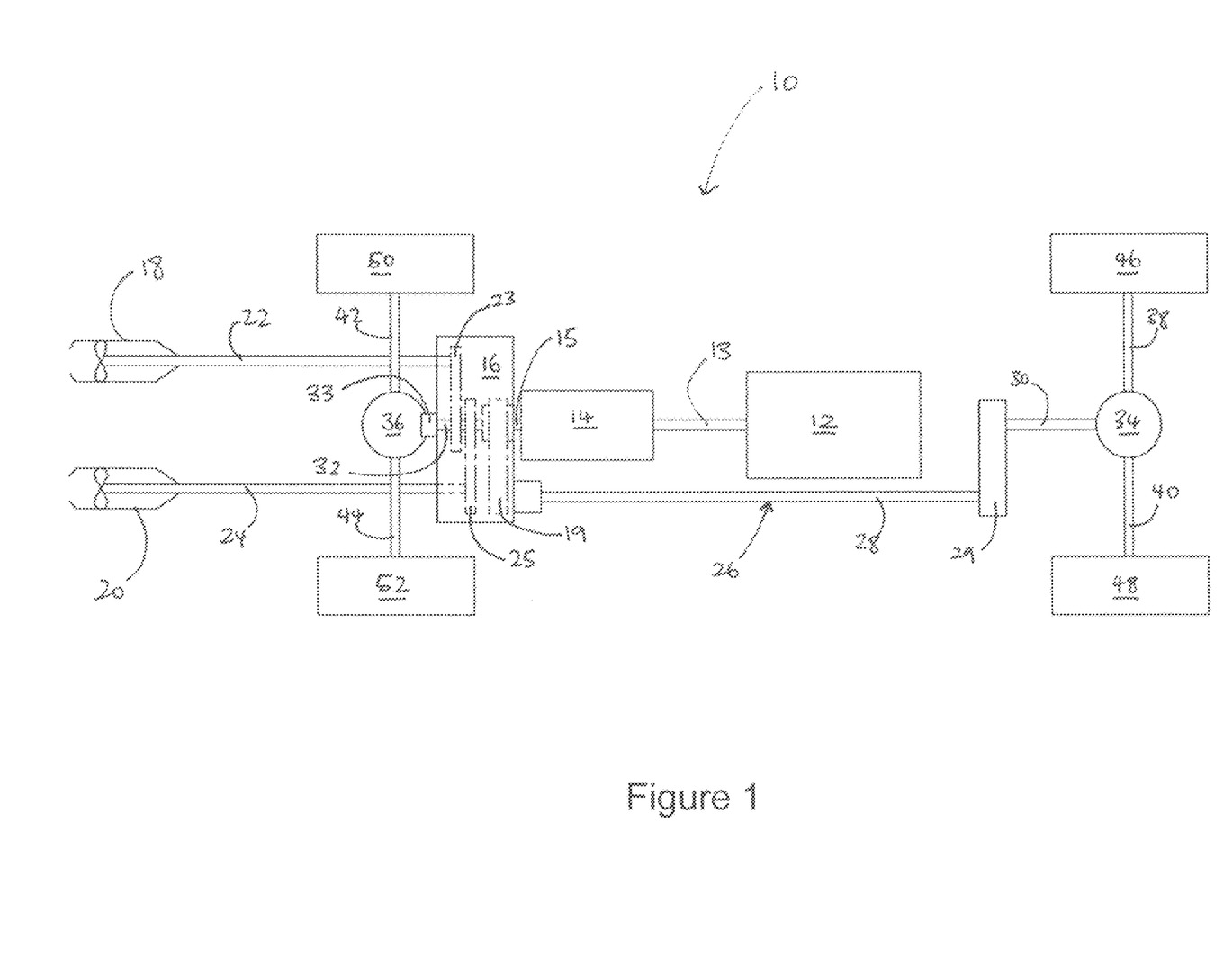
FIG. 1 is a schematic plan view from above of a power train according to a preferred embodiment the present invention.
Figure 2:
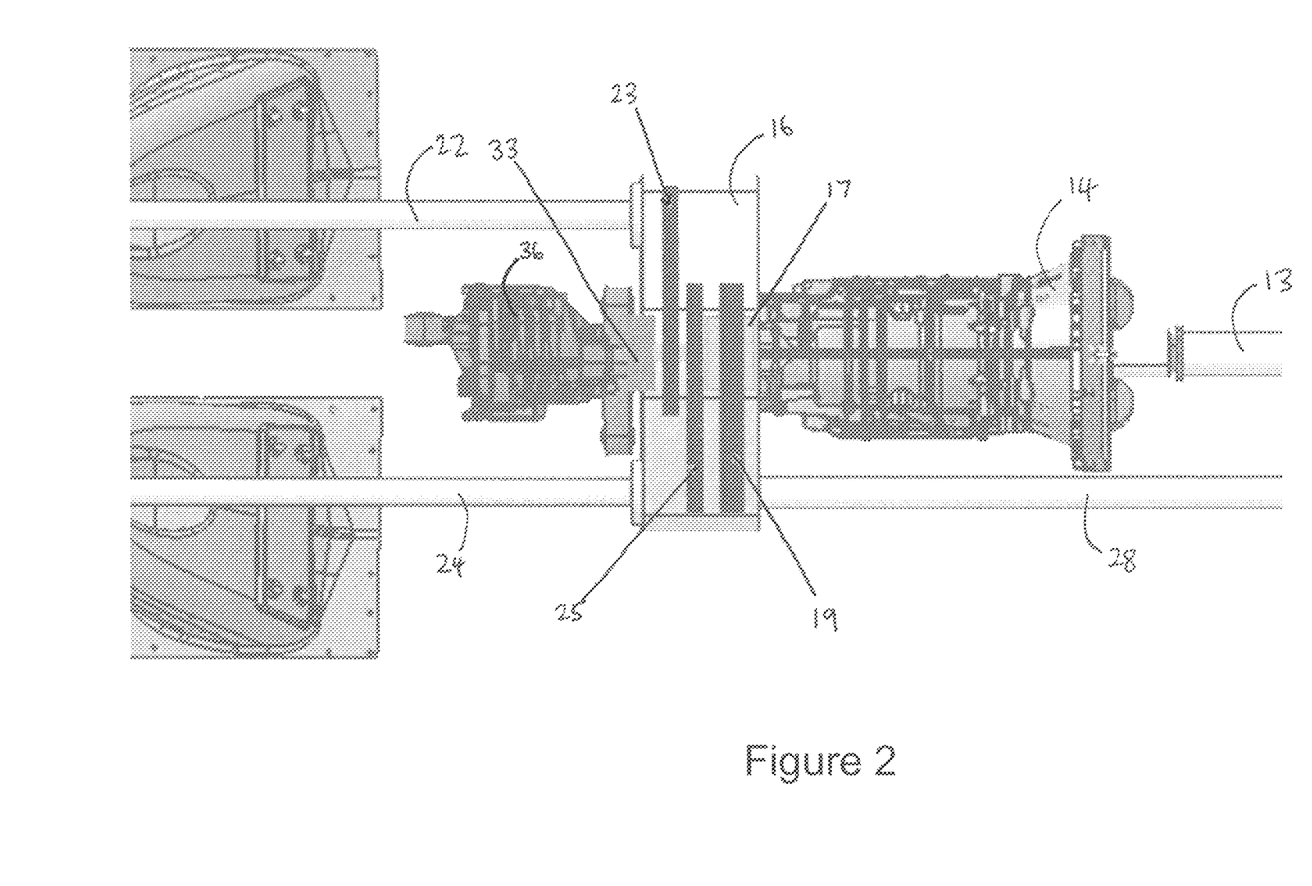
FIG. 2 is an enlarged schematic plan view of part of the power train of FIG. 1.

Referring first to FIGS. 1 and 2, power train 10 can be seen to comprise:
  a prime mover, engine 12;
  a variable speed change transmission 14;
  a transfer case 16;
  two marine propulsion units, port water jet drive 18 and starboard water jet drive 20;
  two marine propulsion drive shafts, port water jet drive shaft 22, starboard water jet drive shaft 24;
  two land propulsion drive shafts, front land propulsion drive shaft 26, formed of first shaft portion 28 and second shaft portion 30, and rear land propulsion drive shaft 32;
  two differentials, front differential 34 and rear differential 36;
  four half (axle) shafts, port and starboard front half shafts 38, 40 and port and starboard rear half shafts 42, 44; and
  four wheels, port and starboard front wheels 46, 48 and port and starboard rear wheels 50, 52.

Variable speed change transmission 14 comprises an input shaft 13 driven by engine 12, and an output shaft 15 which provides drive to the transfer case 16 mounted to the rear (aft) of the transmission 14. Engine 12 may be of any suitable type. In this example, engine 12 is a compression ignition internal combustion engine. The engine 12 and the speed change transmission 14 are mounted longitudinally in the amphibian and are generally aligned with the longitudinal axis of the hull 100 of the amphibian (see FIG. 3), with the speed change transmission 14 being mounted aft of the engine 12. Variable speed change transmission 14 may comprise a manual, sequential shift, semiautomatic or automatic gearbox, continuously variable transmission (CVT), or any suitable variable speed change transmission. By using input shaft 13, rather than mounting the transmission 14 directly to the engine 12, the distance between the engine 12 and the transmission 14 can be increased or reduced depending on the operational requirements of the vehicle, for example to suit the particular packaging requirements of the amphibian or to change its balance. In such a case, the respective lengths of input shaft 13 and output shaft 15 can be adjusted accordingly to suit.

Transfer case 16 includes a lockable centre differential 17 to transfer drive from the output shaft 15 to the front and rear land propulsion drive shafts 26, 32. Transfer case 16 also acts as a power take off to transfer drive from the output shaft 15 to the port water jet drive 22, with port belt 23, and to the starboard water jet drive 24, with starboard belt 25. The ratio of drive between input shaft 15 and drive shafts 22, 24, 26, 32 is 1:1 but may be another ratio (or a variable ratio) selected to suit the particular arrangement or operating conditions.

Port and starboard jet drive input shafts 22, 24 extend rearward (aft) of transfer case 16 to drive the impellers of port and starboard jet drives 18, 20, respectively.

In the preferred embodiment shown in the Figures, the marine propulsion units shown indicatively are water jets 18, 20, but screw propellers or any other suitable marine propulsion means, system or combination may be employed.

The front land propulsion drive shaft 26 is connected to the centre differential 17 by front diff drive belt 19 and runs forward in the amphibian from the transfer case 16 towards the bow and includes a first shaft portion 28 and a second shaft portion 30 which are connected by a front diff drive 29 located at a position forward of, or close/adjacent/mounted to the front of, the engine 12. Front diff drive 29 transmits drive from the first shaft portion 29 to the second shaft portion 30 at a ratio of 1:1 and may be of any suitable type, for example, a belt drive, chain drive, or gear drive. Alternatively, the ratio may be another ratio (or a variable ratio) selected to suit the particular arrangement or operating conditions. The first shaft portion 28 extends from the transfer case 16 to the front diff drive 29 in a direction which is generally parallel with, and offset laterally from, a central longitudinal axis of the hull 100 such that the first shaft portion 28 runs adjacent the longitudinally and centrally arranged engine 12 and above the level of its sump. This allows the engine 12 to be positioned lower in the vehicle which lowers the centre of gravity of the amphibian and the metacentric height. The second shaft portion 30 extends between the front diff drive 29 and the front differential 34 and runs generally in line with a central longitudinal axis of the hull 100, allowing the front differential 34 to be located generally in line with a central longitudinal axis of the hull 100. In turn, front differential 34 provides drive to port front half shaft 38 and starboard front half shaft 40, and on to respective port front wheel 46 and starboard front wheel 48. Locating the front differential 34 centrally in the amphibian allows for up to 90 degree or more of articulation on wheel retraction, which is problematic/not possible with an offset front differential 34.

The rear land propulsion drive shaft 32 runs rearwardly (aft) in the amphibian from the transfer case 16 to the rear differential 36 in order to transmit drive to the rear differential 36. In turn, rear differential 36 provides drive to port rear half shaft 42 and starboard rear half shaft 44, and on to respective port rear wheel 50 and starboard rear wheel 52. As with front differential 34, rear differential 36 is generally aligned with a central longitudinal axis of the hull 100 to allow for up to 90 degree or more of articulation on wheel retraction.

The front and rear differentials 34, 36 transmit drive to the respective front and rear wheels 46, 48, 50, 52 of the amphibian via half (axle) shafts 38, 40, 42, 44 in a conventional automotive manner. Constant velocity (CV) joints may used as appropriate.

A rear decoupler 33 is provided between the rear land propulsion drive shaft 32 and the rear differential 34 to enable drive from the engine 12 to the rear differential 36 to be selectively decoupled, for example when the vehicle is in marine mode, without preventing drive from being transferred to jet drives 18, 20.

A front decoupler (not shown) may be provided between the front diff drive 29 and the second shaft portion 30 to enable drive from the engine 12 to the front differential 34 to be selectively decoupled in a similar manner to the rear differential.

As an alternative, front decoupler (not shown) could be provided at any point between front diff drive belt 19 and the front differential 34. Decouplers may also be provided in the drive line between any/some/all of wheels 46, 48, 50, 52 and its associated driving half shaft 38, 40, 42, 44, and/or between any/some/all of driving half shaft 38, 40, 42, 44 and respective front and/or rear differentials 34, 36 to enable drive from the engine 12 to the wheels 46, 48, 50, 52 to be selectively coupled and decoupled at will. However, all such decouplers are not essential and can be omitted, or selected ones can be omitted. Where present, any suitable decoupler and associated actuation/control system may be employed. Constant velocity joints may be provided as necessary to provide tolerance for angular differences between components in the power train 10. In addition, constant velocity joints may be beneficially employed in wheel retraction for use of the amphibian on water in high speed planing mode and/or for steering.

In use, the power train 10 according to the present invention is extremely flexible and versatile. It can be operated in numerous different ways, these being selected by the amphibian's control systems and/or by or with inputs from the driver. In land mode (including ingress to and egress from the water), the amphibian may be driven in one, two, three or four wheel drive, and with various combinations of the individual wheels selected to provide drive. The jet drives 18, 20 are also driven in land mode. In marine mode, both water jets 18, 20 provide marine propulsion while drive to the wheels is prevented by decoupling of the decoupler(s). By way of example only, the following table indicates a number of the modes/options available in the particular configuration shown in FIG. 1:

| Mode | | Wheel | Water Jet |
|---|---|---|---|
| L | Land | | |
| 1 | 1 wheel drive | Front port 46 | Port 18 and stbd 20 |
| 2 | 1 wheel drive | Front stbd 48 | Port 18 and stbd 20 |
| 3 | 1 wheel drive | Rear port 50 | Port 18 and stbd 20 |

-continued

| | Mode | Wheel | Water Jet |
|---|---|---|---|
| 4 | 1 wheel drive | Rear stbd 52 | Port 18 and stbd 20 |
| 5 | 2 wheel drive | Front port 46 Front stbd 48 | Port 18 and stbd 20 |
| 6 | 2 wheel drive | Rear port 50 Rear stbd 52 | Port 18 and stbd 20 |
| 7 | 2 wheel drive | Front port 46 Rear port 50 | Port 18 and stbd 20 |
| 8 | 2 wheel drive | Front stbd 48 Rear stbd 52 | Port 18 and stbd 20 |
| 9 | 2 wheel drive | Front port 46 Rear stbd 52 | Port 18 and stbd 20 |
| 10 | 2 wheel drive | Front stbd 48 Rear port 50 | Port 18 and stbd 20 |
| 11 | 4 wheel drive | Front port 46 Front stbd 48 Rear port 50 Rear stbd 52 | Port 18 and stbd 20 |
| 12 | Ingress/Egress | Front port 46 Front stbd 48 | Port 18 and stbd 20 |
| 13 | Ingress/Egress | Rear port 50 Rear stbd 52 | Port 18 and stbd 20 |
| 14 | Ingress/Egress | Any, some, all | Port 18 and stbd 20 |
| M | Marine | | |
| 15 | Displacement | None, any, some, all | Port 18 and stbd 20 |
| 16 | Planing | None | Port 18 and stbd 20 |

Of course, further modes/options are available with other configurations. The flexibility and versatility of the power train 10 according to the present invention is thus readily appreciated from the above.

Where the torque curve of the engine 12 is relatively flat above a threshold (e.g. with diesel engines), the speed change transmission 14 provides for fuel efficient use of the engine 12. For example, mode 16 permits sufficient power to get up onto the plane with high revs (say 3800 rpm, purely for example) before easing back the throttle to, say, half revs (say 1900 rpm, purely for example) when on the plane with suitable gear ratio selection using the speed change transmission, thereby improving fuel efficiency and reducing noise. In addition, the speed change transmission 14 allows the torque curve of the engine 12 to be matched to the efficiency curve of the jets 18, 20.

Although the engine 12 and transmission 14 are described as being in line with a longitudinal axis of the hull 100 of the amphibian, alternative configurations are equally possible. For example, the engine 12 may be arranged transversely, with suitable arrangement of the other components.

Figure 3:
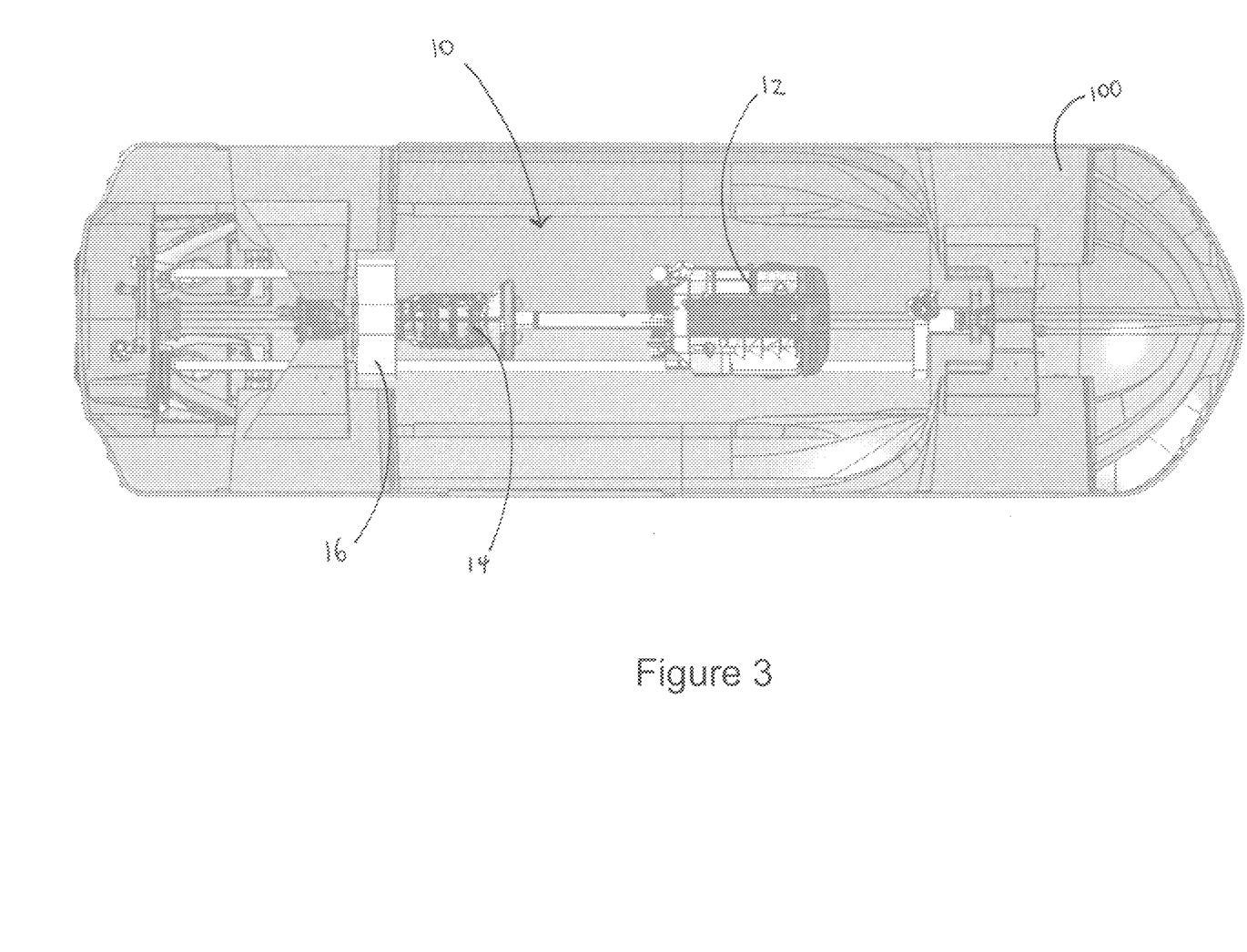
FIG. 3 is a schematic plan view of the power train of FIG. 1, showing the power train located in the hull of an amphibian with certain components omitted for clarity.

FIG. 3 shows a preferred hull 100 of an amphibian in which a power train 10 according to the present invention (and particularly illustrated in FIG. 1) is located.

Retractable wheel (and/or track drive) and suspension assemblies (not shown) as described in the applicant's patents and published patent applications are particularly suitable for use with the power train 10 of the present invention.

Figure 4:
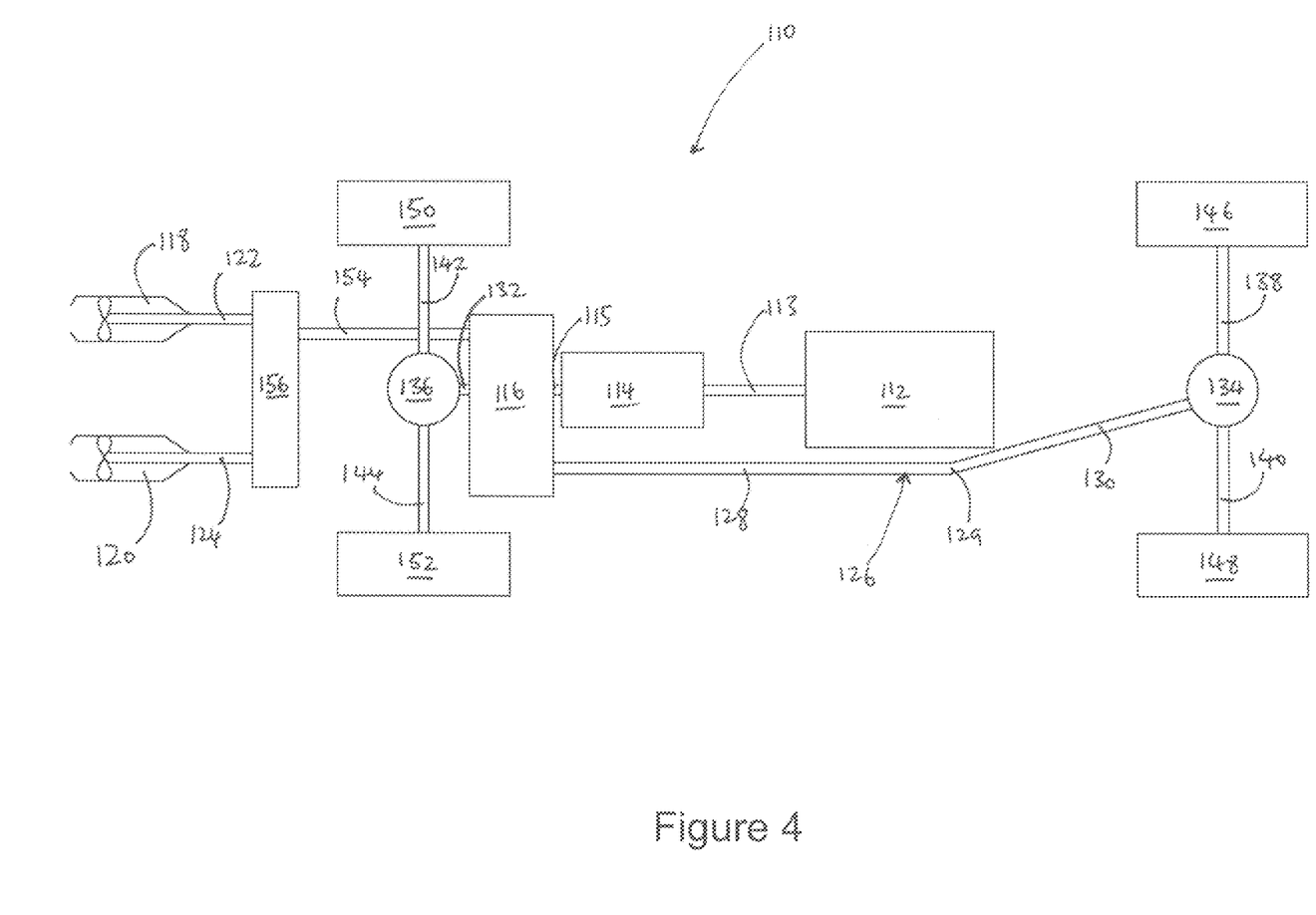
FIG. 4 is a schematic plan view from above of a first alternative embodiment of power train according to the present invention.

FIG. 4 shows a first alternative embodiment of power train 110 according to the present invention. Power train 110 is similar to the power train 10. However, rather than the port and starboard jet drive shafts 22, 24 taking drive directly from the transfer case 16, a jet drive input shaft 154 extends rearward of transfer case 116 to a jet drive transmission 156, which in turn drives port and starboard jet drive shafts 122, 124. Jet transmission 156 may be of any suitable type, for example, a belt drive, chain drive or gear drive. The ratio of drive between jet drive input shaft 154 and port and starboard jet drive input shafts 122, 124 is 1:1 but may be another ratio selected to suit the particular arrangement. Alternatively, the ratio may be a variable ratio. In addition, rather than connecting first and second shaft portions 128, 130 of the front land propulsion drive shaft 126 with a front diff drive, a universal or other suitable joint 129 (e.g. hookes, or CV) is provided between shafts 128 and 130. As with power train 10, first shaft portion 128 runs generally in line with, but laterally spaced from, a central longitudinal axis of the hull of the amphibian. However, unlike in power train 10, second shaft portion 130 extends from universal joint 129 at an angle to the first shaft portion 128 towards a central longitudinal axis of the hull to allow the second shaft portion 130 to connect with, and drive, the front differential 134. The angle at which the universal joint 129 connects the shaft portions 128, 130 is selected based on the packaging requirements of the amphibian. In this example, the universal joint 129 connects the shaft portions 128, 130 at an angle of 7 degrees.

In use, as with power train 10, the wheels 146, 148, 150, 152 and the jet drives 118, 120 are driven by the engine 112 through the variable speed transmission 114. This allows the torque of the engine to be optimised with the efficiency of the jets 118, 120, when the power train 110 is operated in marine mode, and to the speed of the vehicle when operated in land mode. In marine mode, the jets 118, 120 are driven by the engine 112 via variable speed change transmission 114, transfer case 116 and jet transmission 156. Decouplers are disengaged to prevent drive from being transmitted to the wheels 146, 148, 150, 152. In land mode, the jets 118, 120 are driven in the same manner as in marine mode but the decouplers are engaged to allow drive to be transmitted from the engine 112 to the front and rear wheels 146, 148, 150, 152 via variable speed transmission 114, transfer case 116 and front and rear differentials 134, 136, respectively.

Figure 5:
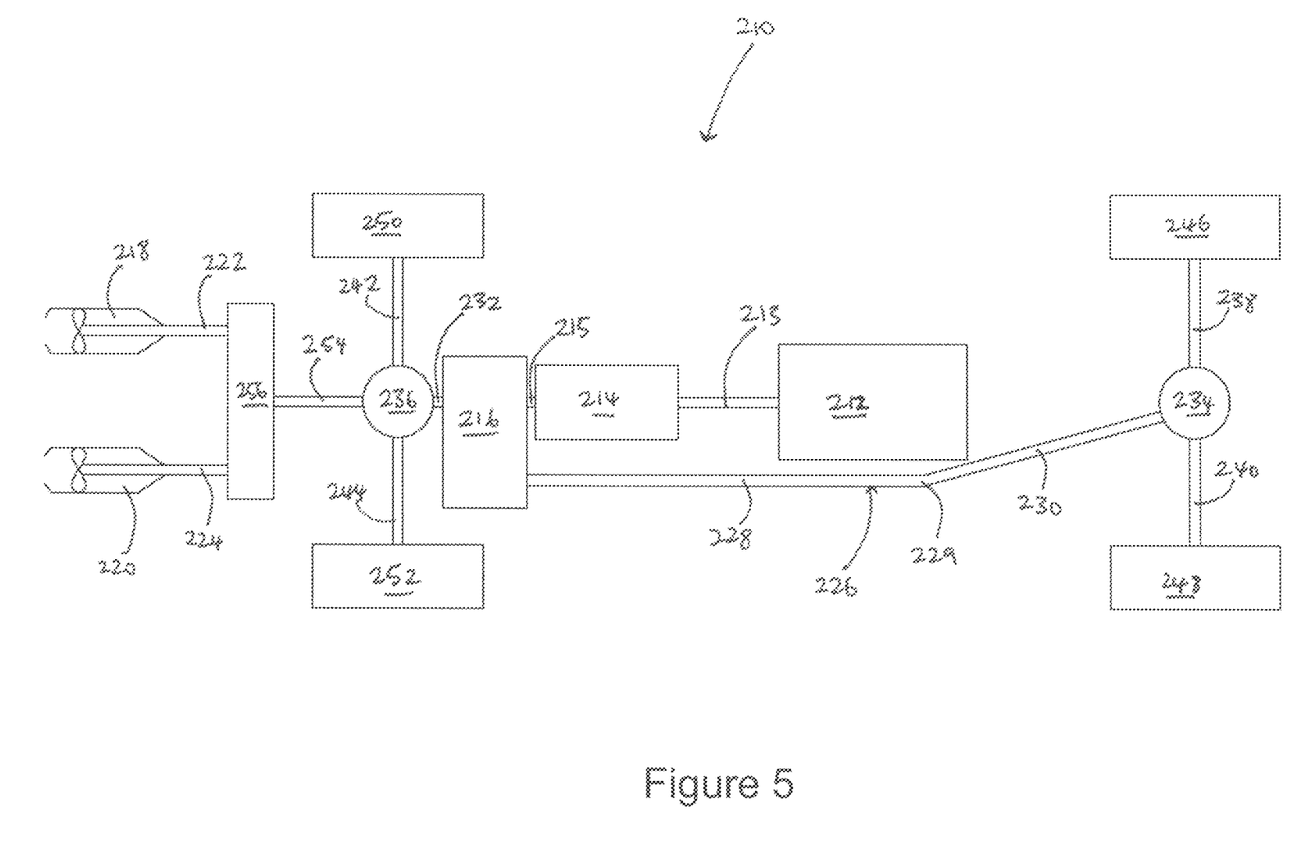
FIG. 5 is a schematic plan view from above of a second alternative embodiment of power train according to the present invention.

FIG. 5 shows a second alternative embodiment of power train 210 according to the present invention. Power train 210 is very similar to power train 110. However, rather than taking drive directly from the transfer case 216, jet drive input shaft 254 takes drive from the transfer case 216 through rear differential 236. To ensure the jet drives 218, 220 remain driven by the engine 212 when the power train 210 is driven in marine mode, a rear decoupler is not provided before the rear differential 236. Instead, a port rear decoupler (not shown) is positioned between the rear differential 236 and port rear wheel 250 and a starboard rear decoupler (not shown) is positioned between the rear differential 236 and starboard rear wheel 252.

In use, as with power trains 10 and 110, the wheels 246, 248, 250, 252 and the jet drives 218, 220 are driven by the engine 212 through the variable speed transmission 214 to allow the torque of the engine to be optimised with the efficiency of the jets 218, 220, when the power train 210 is operated in marine mode, and to the speed of the vehicle when operated in land mode. In marine mode, the jets 218, 220 are driven by the engine 212 via variable speed change transmission 214, transfer case 216, rear differential 236 and jet transmission 256. The front and rear decouplers are disengaged to prevent drive from being transmitted to the wheels 246, 248, 250, 252. In land mode, the jets 218, 220 are driven in the same manner as in marine mode but the decouplers are engaged to allow drive to be transmitted from the engine 212 to the front and rear wheels 246, 248, 250, 252 via variable speed transmission 214, transfer case 216 and front and rear differentials 234, 236, respectively.

Figure 6:
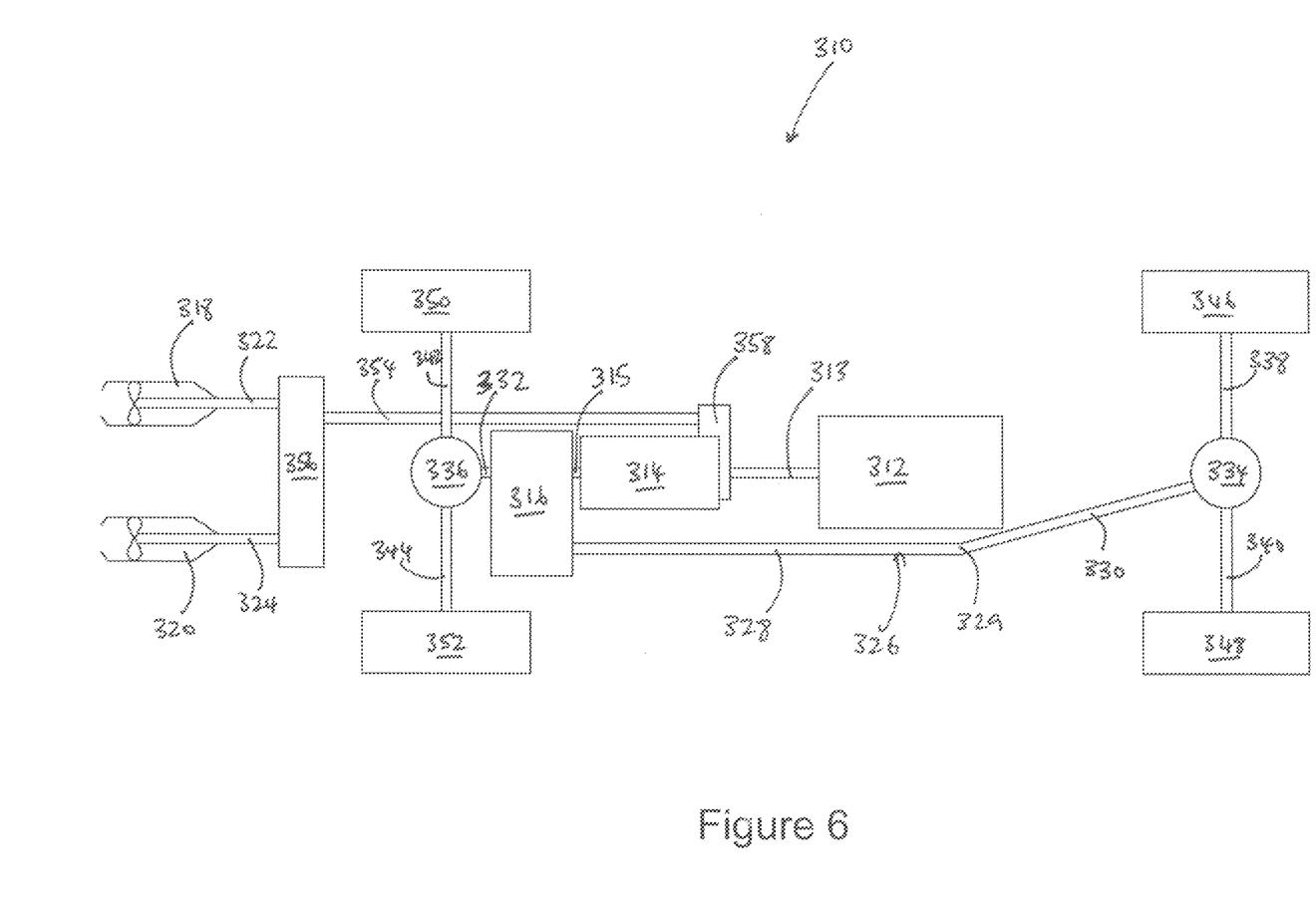
FIG. 6 is a schematic plan view from above of a third alternative embodiment of power train according to the present invention.

FIG. 6 shows a third alternative embodiment of power train 310 according to the present invention. Power train 310 has similarities with power train 110. However, rather than taking drive from the variable speed transmission 314 via the transfer case 316, jet drive input shaft 354 takes drive from a power take off 358 mounted at the front of the variable speed transmission 314. Power take off 358 may be of any suitable type, for example, a belt drive, chain drive or gear drive. Power take off 358 provides, for example, a two-speed transmission, with a standard ratio and an overdrive ratio which allows the jets 318, 320 to be rotated at a faster rate than the engine 312. Particular ratios (or variable ratios) may be selected to suit the particular arrangement or operating conditions. One or more decouplers (not shown) may be positioned at any point between transmission 314 and front and rear differentials 334, 336 to allow drive to the wheels 346, 348, 350, 352 to be selectively disengaged. Alternatively, the decouplers could be dispensed with altogether and the transmission 314 simply placed in a neutral gear to disconnect drive from the wheels 346, 348, 350, 352.

In marine mode, the engine 312 drives the jets 318, 320 via power take off 358 and jet transmission 328, while drive to the wheels 346, 348, 350, 352 is prevented by disengaging the decoupler(s), or by selecting a neutral gear in the variable speed change transmission 314. In land mode, the jets 318, 320 are driven in the same manner as in marine mode and the decoupler(s) engaged to allow drive to be transmitted from the engine 312 to the front and rear wheels 346, 348, 350, 352 via variable speed transmission 314, transfer case 316 and front and rear differentials 334, 336, respectively. Although this arrangement may not provide the level of flexibility in the transmission ratio between the engine 312 and the jets 318, 320 as provided by power trains 10, 110 and 210, nevertheless, the option to change between the standard and overdrive ratios enables the power train 310 to more efficiently deliver power to the jets 318, 320 than would be the case with a conventional 1:1 ratio. Further, by positioning the power take off 358 between the engine 312 and the speed change transmission 314, alternative packaging and weight distribution options are available, and power losses between the engine 312 and jets 318, 320 can be reduced.

Figure 7:
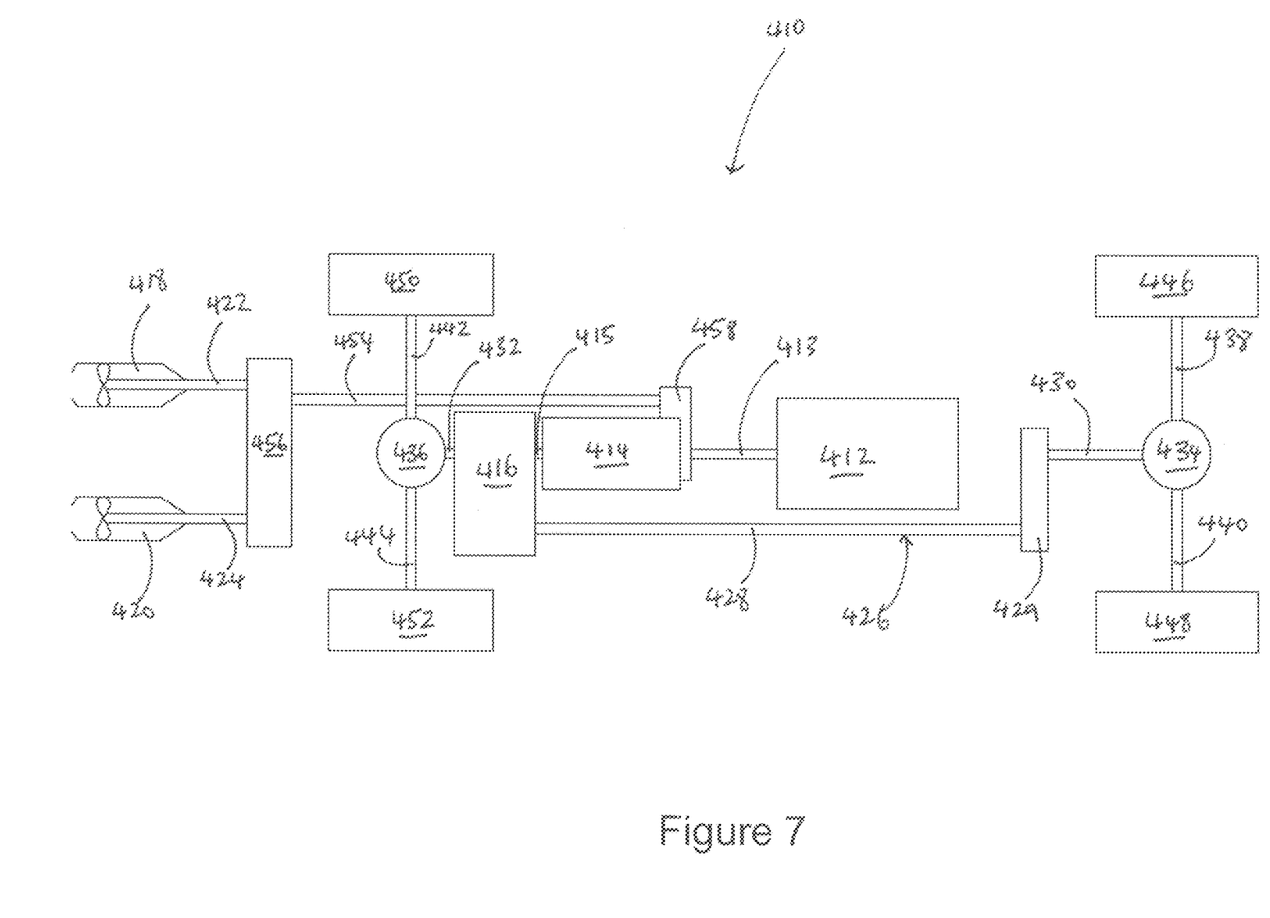
FIG. 7 is a schematic plan view from above of a fourth alternative embodiment of power train according to the present invention.

FIG. 7 shows a fourth alternative embodiment of power train 410 according to the present invention. Power train 410 is very similar to power train 310. However, rather than connecting the first shaft portion 428 and second shaft portion 430 of the front land propulsion drive shaft 426 using a universal joint, a front diff drive 429 is provided between the two shafts 428, 430 as described above in relation to power train 10. As with power train 10, first shaft portion 428 runs adjacent the engine 412 and offset from a central longitudinal axis of the hull of the amphibian. The second shaft portion 430 extends from the front diff drive 429 in a direction generally aligned with a central longitudinal axis of the hull of the amphibian, allowing the second sub shaft 430 to connect with a centrally arranged front differential 434.

In use, power train 410 works essentially in the same manner as described above in relation to power train 310. However, when in land mode and when drive is required at the front wheels 446, 448, drive is transmitted from the first shaft portion 428 to the second shaft portion 430 via the front diff drive 429, rather than through a universal joint.

Figure 8:
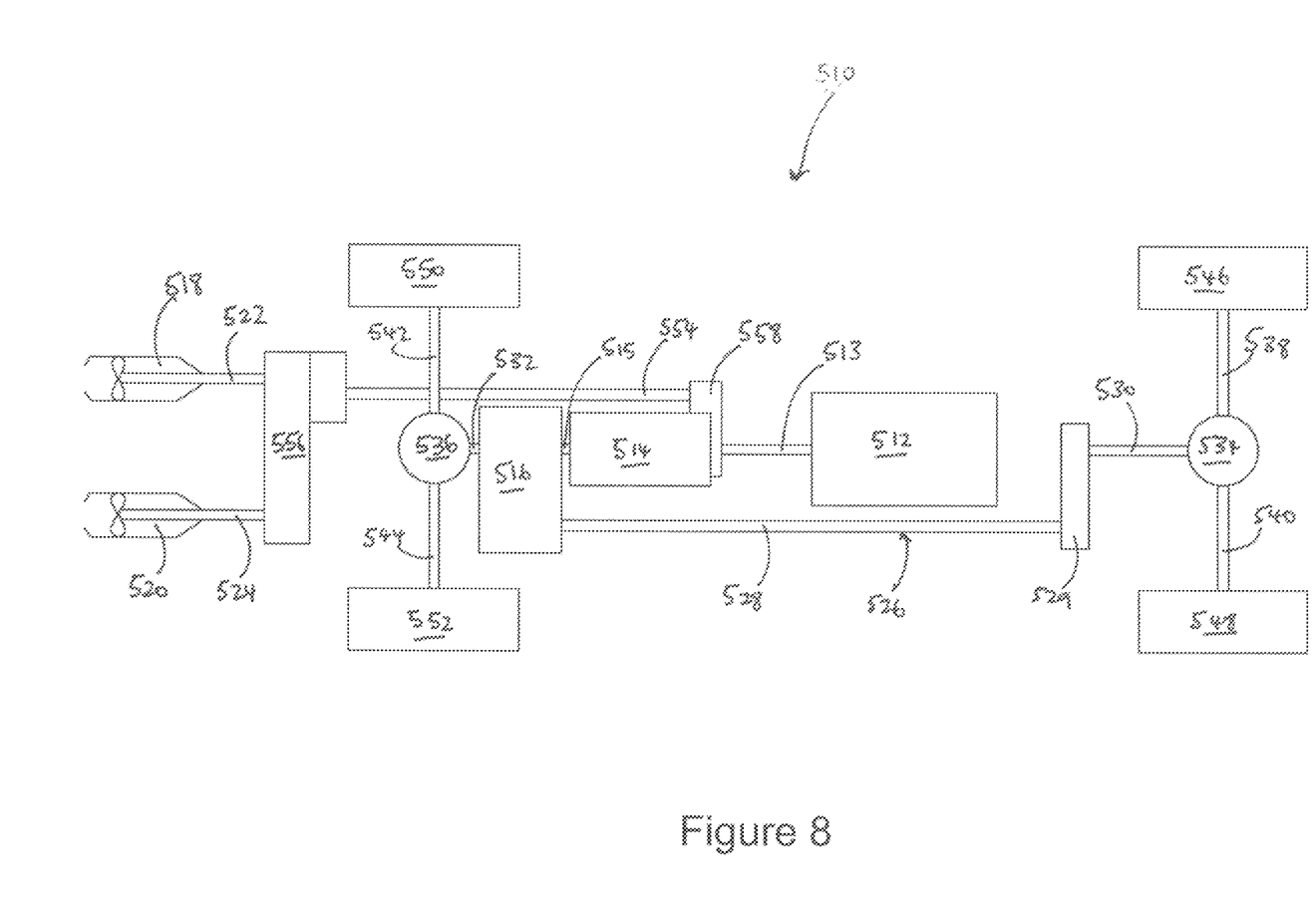
FIG. 8 is a schematic plan view from above of a fifth alternative embodiment of power train according to the present invention.

FIG. 8 shows a fifth alternative embodiment of power train 510 according to the present invention. Power train 510 is very similar in structure and operation as power train 410. However, rather than the power take off 558 providing a two-speed transmission to change the rate of rotation of jet drives 518, 520, the two speed transmission is provided by the jet transmission 556 which has a standard ratio and an overdrive ratio selected to suit the particular arrangement or operating conditions. The power take off 558 can simply provide a single ratio, for example of 1:1.

While decouplers have been described, components in the power train may be provided or supplied with integral decouplers, disconnects or locks (e.g. diff-locks) which can be used as appropriate. Furthermore, drive shafts may be single entities or formed from combinations of shorter drive shafts and/or stub shafts.

Whilst wheels have been described throughout as the land propulsion means, track drives or individual track drives (i.e. to replace a single wheel) may be used as an alternative or in combination with wheels.

Although the transfer case is described throughout as having belts, the transfer case may be of any suitable type, for example, a belt drive, chain drive or gear drive.

Furthermore, the compression ignition internal combustion engine 12, 112, 212, 312, 412, 512 may instead comprise a spark ignition internal combustion engine, or an electric, hydraulic, or hybrid engine. A stealth mode may be incorporated where the prime mover limits noise and heat emissions. For example, the engine 12, 112, 212, 312, 412, 512 may incorporate motor generators which act as alternators to charge batteries, which charge is then used to power the vehicle for periods of time in a stealth mode.

Each feature disclosed in this specification (including the accompanying claims and drawings) may be replaced by alternative features serving the same, equivalent or similar purpose, unless expressly stated otherwise. Thus, unless expressly stated otherwise, each feature disclosed is one example only of a generic series of equivalent or similar features. In addition, all of the features disclosed in this specification (including the accompanying claims, abstract and drawings), and/or all of the steps of a method or process, may be combined in any combination, except combinations where at least some of such features and/or steps are mutually exclusive. Accordingly, while different embodiments of the present invention have been described above, any one or more or all of the features described, illustrated and/or claimed in the appended claims may be used in isolation or in various combinations in any embodiment. As such, any one or more feature may be removed, substituted and/or added to any of the feature combinations described, illustrated and/or claimed. For the avoidance of doubt, any one or more of the features of any embodiment may be combined and/or used separately in a different embodiment with any other feature or features from any of the embodiments.

Whereas the present invention has been described in relation to what is presently considered to be the most practical and preferred embodiments, it is to be understood that the invention is not limited to the disclosed arrangements but rather is intended to cover various modifications and equivalent constructions included within the scope of the appended claims.

The invention claimed is:

1. A power train for an amphibian operable in land and marine modes, the power train comprising:
   a prime mover;
   at least a first land propulsion unit;
   a first marine propulsion unit;
   a second marine propulsion unit;
   at least one speed change transmission; and
   at least one power take off, wherein:
   the prime mover is arranged to drive the at least first land propulsion unit via the at least one speed change transmission in land mode; and the prime mover is arranged to drive the first marine propulsion unit and the second marine propulsion unit via the at least one power take off, and not via the at least one speed change transmission, in marine mode.

2. The power train as claimed in claim 1, wherein the prime mover is arranged to drive the at least first land propulsion unit via the one or more of the at least one speed change transmission, and the another of the speed change transmission in land mode, and the prime mover is arranged to drive the first marine propulsion unit and the second marine propulsion unit via the at least one power take off in the marine mode.

3. The power train as claimed in claim 1, wherein the prime mover comprises a single prime mover arranged to always provide drive to the at least first land propulsion unit via the one or more of the at least one speed change transmission, and the another of the speed change transmission, and to always provide drive to the first marine propulsion unit and the second marine propulsion unit via the at least one power take off in marine mode.

4. The power train as claimed in claim 1, wherein the prime mover always provides drive in marine mode, when drive is provided, via the at least one power take off to both the first marine propulsion unit and the second marine propulsion unit.

5. The power train as claimed in claim 1, wherein the at least one speed change transmission comprises a first speed change transmission coupled to the prime mover a select one of directly and via an input drive shaft driven by the prime mover.

6. The power train as claimed in claim 5, wherein the power train further comprises a first differential coupled to the first speed change transmission via a first land propulsion drive shaft, and wherein the first speed change transmission is arranged to drive the at least first land propulsion unit via the first land propulsion drive shaft and the first differential.

7. The power train as claimed in claim 6, wherein the first differential comprises a rear differential, the first land propulsion drive shaft comprises a rear land propulsion drive shaft, and the at least first land propulsion unit comprises at least one rear wheel or rear track drive or pair of rear wheels or rear track drives.

8. The power train as claimed in claim 1, wherein the power train further comprises one or more decouplers arranged to selectively decouple the prime mover from the at least first land propulsion unit.

9. The power train as claimed in claim 1, the power train further comprising a second land propulsion unit, and wherein the prime mover is arranged to drive the second land propulsion unit via the at least one speed change transmission.

10. The power train as claimed in claim 9, wherein the second land propulsion unit comprises at least one of a front wheel, a front track drive, a pair of front wheels, and a pair of front track drives.

11. The power train as claimed in claim 1, the power train further comprising one or more of a first power take off and a first transfer case coupled to and arranged to receive drive, when drive is provided, from the at least one speed change transmission.

12. The power train as claimed in claim 11, wherein the at least one speed change transmission is arranged to drive one or more of the at least first land propulsion unit, and a second land propulsion unit via at least one of the first power take off and the first transfer case.

13. The power train as claimed in claim 6, the power train further comprising a second differential coupled to the first speed change transmission via a second land propulsion drive shaft, and wherein the first speed change transmission is arranged to drive the second land propulsion unit via the second land propulsion drive shaft and the second differential.

14. The power train as claimed in claim 13, wherein the second differential comprises a front differential, and the second land propulsion drive shaft comprises a front land propulsion drive shaft.

15. The power train as claimed in claim 13, wherein at least a portion of the second land propulsion drive shaft runs adjacent the prime mover and above a lowermost part of the prime mover.

16. The power train as claimed in claim 13, wherein the second land propulsion drive shaft comprises a first shaft portion coupled to a second shaft portion, wherein the second shaft portion is arranged to transmit drive from the first shaft portion to the second differential.

17. The power train as claimed in claim 16, wherein the second shaft portion is coupled to the first shaft portion by one or more of a universal, a hooker and a CV joint such that the longitudinal axis of the second shaft portion may be arranged at an angle to the longitudinal axis of the first shaft portion.

18. The power train as claimed in claim 17, wherein the second shaft portion is coupled to the first shaft portion by one or more of a belt drive, a gear drive, and a chain drive such that the longitudinal axis of the second shaft portion is offset laterally from the longitudinal axis of the first shaft portion.

19. The power train as claimed claim 16, wherein the first shaft portion runs adjacent the prime mover and is coupled to the second shaft portion at a location ahead of the prime mover.

20. The power train as claimed in claim 9, wherein the power train further comprises one or more decouplers arranged to selectively decouple the prime mover from the second land propulsion unit.

21. The power train as claimed in claim 9, wherein the at least first land propulsion unit comprises one or more of a rear set of wheels and a rear set of track drives and the second land propulsion unit comprises one or more of a front set of wheels and a front set of track drives.

22. The power train as claimed in claim 8, further comprising a control unit to selectively activate and deactivate any of the one or more decouplers in the power train.

23. The power train as claimed in claim 1, wherein one or more of the at least one power take off or the at least one speed change transmission is arranged to drive, when drive is provided, the first marine propulsion unit via a first marine propulsion drive shaft and is arranged to drive the second marine propulsion unit via a second marine propulsion drive shaft.

24. The power train as claimed in claim 23, wherein the power train further comprises a third marine propulsion drive shaft arranged to be driven by the prime mover, when drive is provided, and arranged to drive first and second marine propulsion drive shafts via a marine drive transmission.

25. The power train as claimed in claim 24, wherein the one of more of the at least one power take off or the at least one speed change transmission, and the another of the speed change transmission is arranged to drive the third marine propulsion drive shaft directly.

26. The power train as claimed in claim 24, wherein the one or more of the at least one speed change transmission and the another of the speed change transmission is arranged to drive the third marine propulsion drive shaft via one or more of the first power take off, a first transfer case, another power take off and another transfer case.

27. The power train as claimed in claim 24, wherein the one or more of the at least one power take off or the at least one of the speed change transmission, and the another of the speed change transmission is arranged to drive the third marine propulsion drive shaft via the first differential.

28. The power train as claimed in claim 24, wherein the power train further comprises one or more of a second power take off and a transfer case coupled to receive drive directly from the prime mover and arranged to drive, when drive is provided, the third marine propulsion shaft.

29. The power train as claimed in claim 28, wherein the at least one power take off or the at least one speed change transmission comprises at least first and second speed change transmissions.

30. The power train as claimed in claim 29, wherein the second speed change transmission comprises the one or more of the second power take off and the transfer case, wherein the one or more of the second power take off and the transfer case being arranged to selectively alter the transmission ratio between the prime mover and the third marine propulsion shaft.

31. The power train as claimed in claim 29, wherein the second speed change transmission comprises the marine drive transmission, the marine drive transmission being arranged to selectively alter the transmission ratio between the third marine propulsion shaft and the first and second marine propulsion shafts.

32. The power train as claimed in claim 1, wherein the prime mover comprises one or more of a spark ignition internal combustion engine, a compression ignition internal combustion engine, an electric motor, a hydraulic motor, a hybrid engine, and a motor generator.

33. The power train as claimed in claim 1, wherein at least one of the first marine propulsion unit and the second marine propulsion unit comprise one or more of a water jet, and a propeller.

34. The power train according to claim 1, wherein the at least one speed change transmission comprises a variable speed change transmission.

35. The power train according to claim 1, wherein the at least one speed change transmission comprises one or more of a manual gearbox, a sequential shift gearbox, a semiautomatic gearbox, an automatic gearbox, and a continuously variable transmission.

36. The power train according to claim 1, wherein the at least one speed change transmission is coupled to the prime mover via an input shaft arranged such that the at least one speed change transmission is distanced from the prime mover.

37. An amphibian comprising the power train of claim 1.

38. The amphibian as claimed in claim 37, wherein the prime mover is positioned substantially in line with a longitudinal axis of the amphibian.

39. The amphibian as claimed in claim 37, wherein the at least one speed change transmission is located rearwardly of the prime mover.

40. The amphibian as claimed in claim 37, wherein the at least first land propulsion unit may be retracted above the lowest point of the hull for use on water in marine mode, and may be protracted below the lowest point of the hull for use on land in land mode.

41. The amphibian as claimed in claim 37, wherein when the amphibian is operated in a marine mode the first and second marine propulsion units can power the amphibian to a speed where sufficient hydrodynamic lift is achieved for the amphibian to plane.

42. The amphibian as claimed in claim 37, wherein when the amphibian is operated in a land mode it can be driven in one, two, three and four wheel drive.

43. A power train for an amphibian operable in land and marine modes, the power train comprising:
  a prime mover;
  at least a first land propulsion unit;
  at least a first marine propulsion unit; and
  at least one speed change transmission; and
  at least one power take off, wherein:
  the prime mover is arranged to drive the at least first land propulsion unit via the at least one speed change transmission in land mode; and
  the prime mover is arranged to drive the at least first marine propulsion unit via the at least one power take off, and not via the at least one speed change transmission, in marine mode.

44. The power train according to claim 43, wherein the prime mover is arranged to drive the at least first land propulsion unit via the one or more of the at least one speed change transmission, and the another of the speed change transmission in land mode, and the prime mover is arranged to drive the first marine propulsion unit and the second marine propulsion unit via the at least one power take off in marine mode.

45. An amphibian comprising the power train of claim 43.

* * * * *

UNITED STATES PATENT AND TRADEMARK OFFICE
CERTIFICATE OF CORRECTION

PATENT NO. : 11,065,927 B2
APPLICATION NO. : 15/437173
DATED : July 20, 2021
INVENTOR(S) : Gibbs It is certified that error appears in the above-identified patent and that said Letters Patent is hereby corrected as shown below:

In the Specification

Column 1, Line 25:
Delete "in"

Column 2, Line 20:
After "embodiment" insert -- of --

Column 2, Line 28:
After "of" insert -- the --

Column 2, Line 31:
After "of" insert -- the --

Column 2, Line 34:
After "of" insert -- the --

Column 2, Line 37:
After "of" insert -- the --

Column 2, Line 40:
After "of" insert -- the --

Column 3, Line 44:
"by" should be – be –

Column 3, Line 65:
"degree" should be – degrees –

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,065,927 B2

Column 4, Line 9:
"degree" should be – degrees –

Column 4, Line 15:
After "may" insert -- be --

Column 4, Line 32:
"shaft" should be – shafts –

Column 7, Line 53:
Delete "sub"

In the Claims

Column 9, Claim 2, Line 12:
After "in" delete "the"

Column 10, Claim 17, Line 21:
"hooker" should be – hookes –

Column 10, Claim 25, Line 61 (1$^{ST}$ occurrence):
"of" should be – or –